Aug. 2, 1960

D. A. MURRAY ET AL 2,947,400

BALE TURNER

Filed Sept. 26, 1958

Inventors:
Donald A. Murray
John W. Whitby
Paul O. Pippel
Atty.

Aug. 2, 1960 D. A. MURRAY ET AL 2,947,400
BALE TURNER
Filed Sept. 26, 1958 2 Sheets-Sheet 2
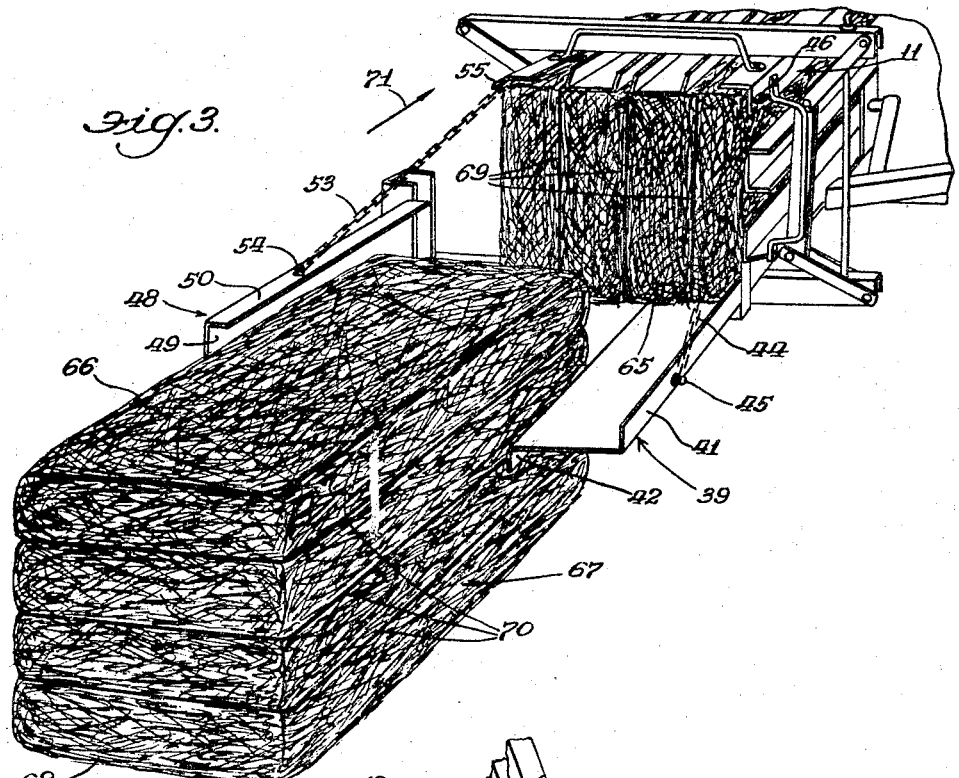
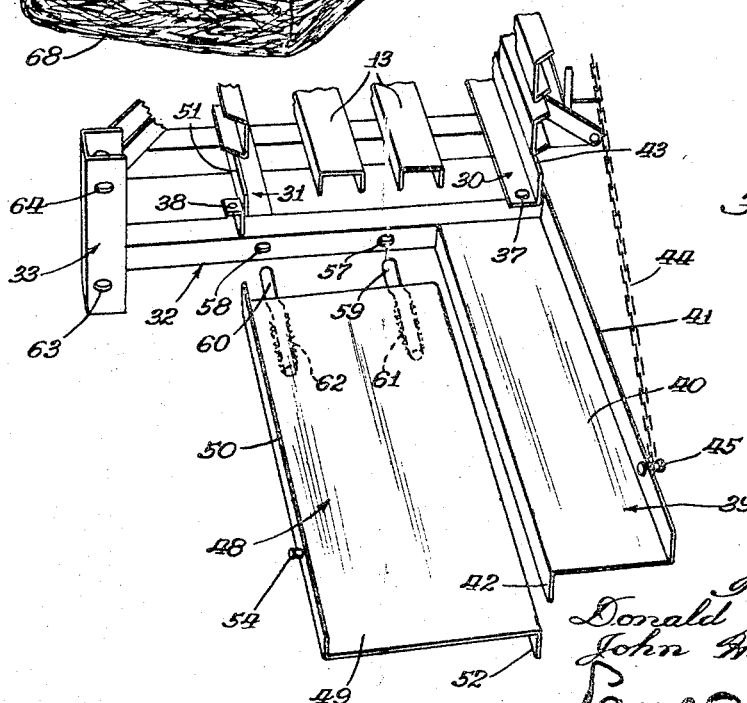
Inventors:
Donald A. Murray
John H. Whitby
Paul O. Pippel
Atty.

United States Patent Office 2,947,400
Patented Aug. 2, 1960

2,947,400

BALE TURNER

Donald A. Murray and John H. Whitby, Stockton, Calif., assignors to International Harvester Company, Chicago, Ill., a corporation of New Jersey Filed Sept. 26, 1958, Ser. No. 763,721

7 Claims. (Cl. 193—5)

This invention relates to a new and improved bale turner.

It is the custom of present-day balers to discharge their formed bales onto the ground for pick-up at a later time. The bales are generally rectangular in cross section and depending upon the pick-up mechanism it might be desirable to lay the bales flat or cause them to turn so that the bale is lying on one of its narrow sides. In most instances however it is desirable that the bales extend longitudinally along the path of travel of the baler and the subsequent picking up machine.

It is a principal object of this invention to provide a discharge mechanism for hay balers in which the bales may be optionally laid flat on the ground or on their sides.

Another important object of this invention is to supply a bale turner for hay balers in which the discharging formed bale is turned ninety degrees in its fall from the baler to the ground and is prevented from turning further by suitable guiding means.

Another important object of this invention is the provision of means for accepting bales from the discharge end of a bale forming chamber wherein a portion of a receiving deck may be employed either to effect a flat discharge of the bales or a guided and turned discharge of the bales so that the bales fall on their narrow sides.

A still further important object of this invention is to equip a discharging portion of a hay baler with suitable receiving structure wherein guiding members may be movably positioned at various locations in said receiving structure to optionally deliver the formed bales flat or on their short narrow sides.

Other and further important objects and advantages will become apparent from the disclosures in the following specification and accompanying drawing:

In the drawings:

Figure 3 is a perspective view of the device taken from the other side thereof and disclosing a bale having been discharged from the hay baler and turned in its discharge, and Figure 4 is a perspective view detail of a portion of the bale turner of this invention shown in disassembled position.

Figure 1:
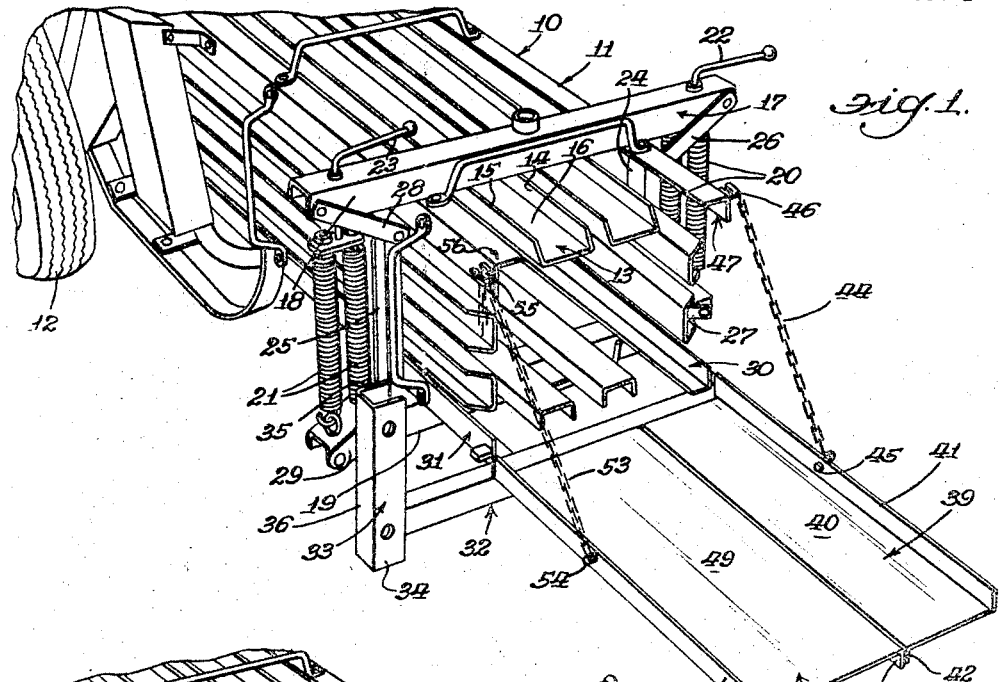
Figure 1 is a perspective view of the discharge end of a hay baler having the bale guiding and turning mechanism of this invention mounted thereon.

As shown in the drawings: The reference numeral 10 indicates generally a hay baler of which only the rearward portion of the bale forming chamber 11 is shown along with one of the ground-engaging wheels 12. The remaining parts of the hay baler have not been shown in these drawings inasmuch as they form no part of the present invention. The rearward end of the bale forming chamber 11 comprises a rectangularly shaped tube having sides of channel-shaped members laterally spaced apart. The base walls of the U-shaped channels face inwardly to provide a smooth unbroken surface against which the formed bales may slidably pass. For further identification the channel members shall be broadly identified by the numeral 13 having side walls 14 and 15 and an adjoining base member 16.

Restrictor mechanism is shown broadly at 17 and includes cross members 18 and 19 across the top and bottom of the bale forming chamber 11. Spring members 20 and 21 flank the side walls of the chamber 11 and by means of adjusting screws 22 and 23 the degree of spring compression of the cross members 18 and 19 may be controlled. Vertical side members 24 and 25 abut the side channels in much the same manner as the cross pieces 18 and 19 and these vertical side members 24 and 25 are supported by link members 26, 27, 28 and 29 extending between the cross members 18 and 19 and the vertical side compression members 24 and 25. The linkage is such that when the members 18 and 19 extending across the top and bottom respectively of the bale forming chamber 11 are drawn together the side members 24 and 25 are caused to be moved inwardly to thereupon compress the side walls of the bale forming chamber to substantially the same degree as the top and bottom walls. Similarly when the top and bottom members 18 and 19 are spread outwardly so also the vertical side members 24 and 25 move outwardly to loosen the walls of the bale forming chamber and permit the formed bales therewithin to slide outwardly with a lesser resistance. All of this material is merely incidental relative to the subject invention, but it provides environment showing one form of a bale forming chamber which might exist on a baler to which the turning mechanism of this invention may be applied.

The lower side walls of the bale forming chamber 11 are equipped with angle rail members 30 and 31 which project rearwardly beyond a discharge opening defined by the ends of the channel members 13. A tubular member of square cross section 32 is affixed to the end of the rail members 30 and 31 and provides the frame supporting means for the bale discharge elements of this invention. A vertical member 33 in the form of a channel is fixedly attached to the cross tube 32 and forms a supplemental part of the frame structure to which the bale turner elements are attached in various arrangements. The channel member 33 has side walls 34 and 35 and an adjoining end wall 36. The open channel fits over the end of the square tube 32 and as previously stated is affixed thereto to constitute an integral and fixed part of the supporting structure mounted on the baler 10 to which a delivery chute it attached. It is believed that Figure 4 depicts the supporting structure 32—33 of the present device. As shown in Figure 4 the tubular member 32 is fastened by means of bolts or the like 37 and 38 to the angle members 30 and 31 extending rearwardly from the bale forming chamber 11. The tubular member 32 is provided with a fixed rearwardly extending bale chute part 39 having a deck portion 40, an upturned relatively short side wall 41, and a downwardly turned flange or relatively short wall 42 on the inner side thereof. The chute member 39 abuts the tubular member 32 at one side of the bale forming chamber with the short vertical wall 41 in alignment with and forming a substantial continuation of a vertical wall 43 of the angle member 30. A chain 44 is anchored to a supporting bolt 45 located midway of the front and rear ends of the chute part 39. The other end of the chain 44 is fastened at 46 to an angle member 47 constituting the upper corner of the bale forming chamber 11. The chain 44 thus acts as a brace for the chute part 39.

A supplemental part of the bale delivery chute is shown at 48 in Figures 1 and 4 and has a flat deck portion 49. The deck portion 49 is substantially wider than the deck 40 of the chute part 39. The chute part 48 includes an upwardly turned side flange or wall 50 which corresponds to the side wall 41 of the chute part 39 and when mounted as in Figure 1 it is in general alignment with a vertical wall 51 of the angle member 31 to which the cross tube or beam 32 is attached. A downwardly turned side flange 52 is provided on the inside of the deck 49 and when the device is assembled as in Figure 1 the downwardly projecting flanges 42 and 52 abut one another and form an adjoining wall. The chute parts 39 and 48 thus complement each other to form a continuous chute or delivery deck over which the completed bales may be discharged. In the assembly of the device as shown in Figure 1 wherein the chute parts 39 and 48 are in side-by-side relationship the chute part 48 is braced by a chain 53. The chain has one end attached to a bolt member 54 on the side wall 50 of the member 48 and its other end attached at 55 on an angle member 56 constituting the upper corner of the bale forming chamber opposite the corner defined by the angle member 47. The chute as shown in Figure 1 and comprising the elements 39 and 48 provide for the discharge of formed bales directly rearwardly for deposit on the ground on their flat or relatively broad sides. The shape of an ordinary bale forming chamber such as that shown at 11 is generally rectangular in cross section so that the horizontal dimension is somewhat greater than the vertical dimension thus creating a formed and compressed bale of the same outside proportion. With the chute as shown in Figure 1 the broad side of these bales is laid down and the bales laid endwise in a substantially straight row in the field for subsequent picking up and storing.

As further shown in Figure 4 the cross tubular beam 32 is provided with holes 57 and 58 which are spaced apart and are in the area left exposed adjacent the chute member 39. Rodlike projections 59 and 60 are weldably or otherwise fastened as at 61 and 62 to the underside of the deck 49 of the chute element 48. In the view of the device as shown in Figure 1 the chute member 48 has its projections 59 and 60 engaging the apertures 57 and 58 respectively in the cross tube member 32 to thereupon rigidly support the inner end of the deck element 48 with respect to the cross tube member 32. It should be apparent that herein is provided a removable chute part 48 which may be assembled as shown in Figure 1 or removed from the engagement with the tube member 32 such as shown in Figure 4.

Figure 2:
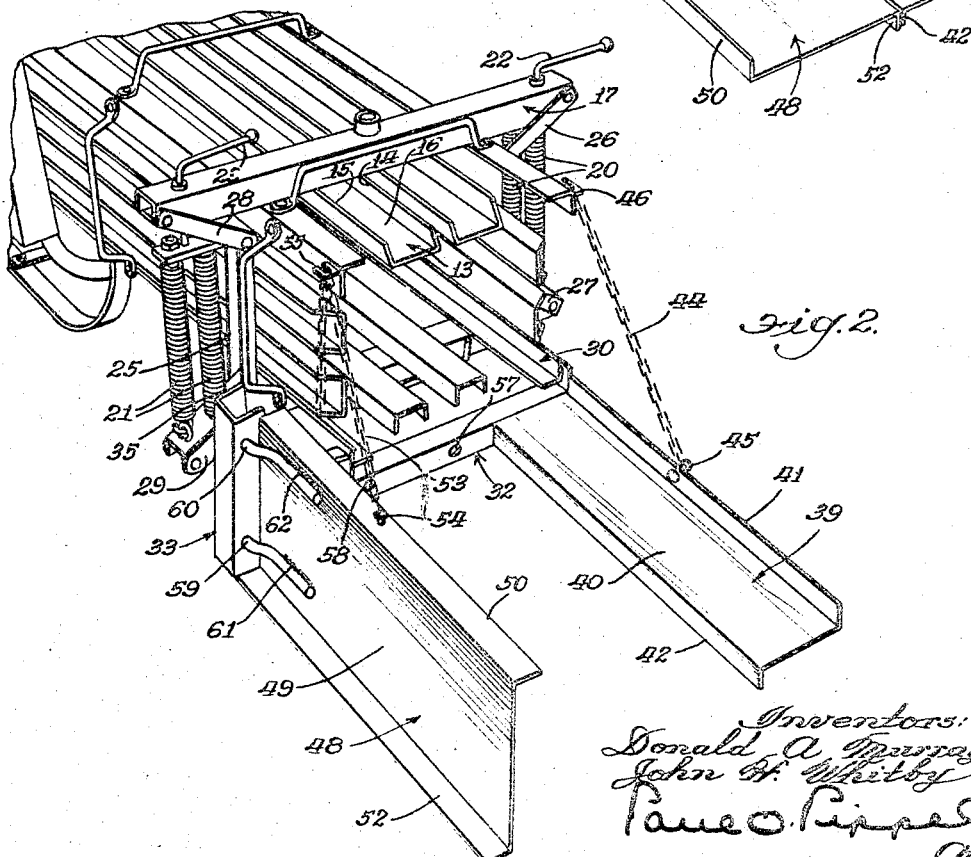
Figure 2 is a perspective view similar to Figure 1 wherein the discharging mechanism has been shifted to another of its positions to effect a turning of the bale being discharged.

Further as shown in Figure 4 the vertical channel member 33 which forms a unitary part of the frame supporting structure 32 is provided with spaced apart apertures 63 and 64 which are spaced equally to the spacing of the holes 57 and 58 and to the spacing of the projections or prongs 59 and 60 on the chute member 48. As shown in Figures 2 and 3 the chute part 48 has been removed from its side-by-side relationship with the chute part 39 where it completed and formed a full chute for straight flat delivery of the formed bales and this chute part 48 has now been placed into the vertical supporting channel 33. The chute part 48 has its integral projections 59 and 60 engaging the apertures 63 and 64 respectively in the vertical channel member 33 which is spaced outwardly from the side wall of the bale forming chamber defined by the angle members 31 and 56. There is thus substantial space between the inner edge of the chute part 39 as defined by the flange 42 and the newly located position of the chute part 48 wherein it is disposed vertically within the supporting member 33.

As best shown in Figure 3 a bale of hay or the like 65 has its relatively long or broad side disposed horizontally when it is within the bale forming chamber 11 and as the bale is discharged by the formation of succeeding bales within the bale forming chamber 11 it rides out onto the chute part 39 until it is released from the walls of the bale forming chamber. At this point the lack of support beneath the major portion of the bale causes it to drop over against the vertically disposed chute part as shown in Figures 2 and 3 causing the long side 66 of the newly discharged bale designated as 67 to strike the vertical wall 49 of the chute part 48 and thereupon the bale 67 is dropped to the ground where its short or narrow side 68 is in ground-engagement. The discharging bales are prevented from further tumbling by the vertical wall member 49 of the chute part 48. Bale encircling strands 69 and 70 are applied by means (not shown) within the bale forming chamber 11 to hold the bales in a fixed state.

In the operation of the device of this invention the hay baler 10 is propelled through a field of hay in the direction of the arrow 71. The hay has preferably been previously cut and placed in windrows whereupon the baler picks up the hay and compresses it into a bale forming chamber such as that shown at 11 whereafter it is tied with the bale encircling strands 69 and 70 as shown for the bales 65 and 67 in Figure 3. If it is desired to lay the bales flat in the field for a subsequent pick-up or in other words on the long broad side 66 of the bale the chute is arranged as shown in Figure 1 wherein the chute elements 39 and 48 complement each other to form a full chute directly to the rear of the discharge opening of the bale forming chamber whereupon the long side of the bale is laid on the ground and the bales disposed endwise in the field. However, in many instances the operator desires to turn the bales for easier subsequent pick-up or for drying purposes or for any one of a number of reasons and having this in mind he removes the chute portion 48 from the position shown in Figure 1 to the position as shown in Figures 2 and 3. This opens the major portion of the area behind the bale forming chamber 11 so that the bale 67 when it emerges from the bale forming chamber rides out on the narrow ledge 40 of the chute member 39 until it is released from the walls of the bale forming chamber whereafter it falls laterally so that the long side thereof 66 strikes the vertical wall 49 of the chute member 48. This performs two functions that of guiding the bale 67 to the ground so that its short or narrow side 68 is deposited on the ground and it prevents the bale from rolling over a greater amount. The presence of the vertical wall thus holds the bale against further turning beyond the desired 90°.

We are aware that numerous details of construction may be varied througout a wide range without departing from the principles disclosed herein and we therefore do not propose limiting the patent granted hereon otherwise than as necessitated by the appended claims.

What is claimed is:

1. A bale delivery mechanism for balers having bale forming chambers comprising a supporting structure affixed to the baler, a narrow chute part carried on said supporting structure and in alignment with one side edge of the bale forming chamber, a wider chute part removably engaging said supporting structure in a horizontal position to complement said narrow chute part to form a flat unbroken chute and rearwardly engaging said supporting structure in a vertical position spaced from said narrow chute part and outside the other side edge of the bale forming chamber and in said position forming a spaced apart side wall to cause turning of the discharging bales from the baler and guiding them to the ground.

2. A bale discharge device for balers of the type having a bale forming chamber comprising a generally horizontal cross frame member disposed at and across the bottom of the discharging end of the bale forming chamber, said cross frame member projecting laterally beyond the side of the bale forming chamber, a generally vertical frame member affixed to the laterally projecting end of the cross frame member, a narrow chute part affixed to said cross frame member in alignment with the side of the bale forming chamber opposite the laterally projecting end of the cross frame member, a wider chute part, means on said cross frame member for removably receiving said wider chute part in a horizontally disposed position and complementary to said narrow chute part for a straight discharge of bales from said baler, and means on said vertical frame member for removably receiving said wider chute part in a vertically disposed position and spaced from said narrow chute part to provide a spaced apart side wall for effecting a limited turning of the bales discharged from said baler.

3. A device as set forth in claim 2 in which the means on the cross frame member and the means on the vertical frame member includes said cross frame member and said vertical frame member having spaced apart apertures, and said wider chute part having integral spaced projections for removable insertion in the spaced apart apertures in the cross frame member and the spaced apart apertures in the vertical frame member.

4. A device as set forth in claim 3 in which there is included chain brace means interposed between the narrow chute part and the bale forming chamber and the wider chute part and the bale forming chamber.

5. A device as set forth in claim 2 in which the narrow chute part has an upturned flange along its side in alignment with the side of the bale forming chamber and a downwardly turned flange along its side away from said side of the bale forming chamber, said wider chute part having a downwardly turned flange along one side thereof and an upturned flange along its other side, and said wider chute part in its horizontal position having its downwardly turned flange abutting the downwardly turned flange of the narrow chute part and its upturned flange in alignment with the other side of the bale forming chamber.

6. A bale delivery mechanism for balers having bale forming chambers comprising a supporting structure affixed to the baler, a first chute part carried on said supporting structure and in alignment with one side edge of the bale forming chamber, a second chute part removably positioned in said supporting structure in a horizontal position to complement said first chute part to form a flat chute and removably positioned in said supporting structure in a vertical position spaced from said first chute part and forming a side wall to permit turning of the discharging bales from the baler and guiding them to the ground.

7. A bale discharge device for balers of the type having a bale forming chamber comprising a generally horizontal cross frame member disposed at and across the bottom of the discharging end of the bale forming chamber, said cross frame member projecting laterally beyond the side of the bale forming chamber, a generally vertical frame member affixed to the laterally projecting end of the cross frame member, a first chute part affixed to said cross frame member in alignment with the side of the bale forming chamber opposite the laterally projecting end of the cross frame member, a second chute part, means on said cross frame member for removably receiving said second chute part in a horizontally disposed position and complementary to said first chute part for a straight discharge of bales from said baler, and means on said vertical frame member for removably receiving said second chute part in a vertically disposed position and spaced from said first chute part to provide for a turning of the bales discharged from said baler.

References Cited in the file of this patent

UNITED STATES PATENTS

| | | |
|---|---|---|
| 2,722,096 | Tice et al. | Nov. 1, 1955 |
| 2,724,476 | Steptoe | Nov. 22, 1955 |
| 2,833,108 | Kriva et al. | May 6, 1958 |